C. F. WENSINGER.
WIND SHIELD.
APPLICATION FILED NOV. 6, 1915.
1,219,513.
Patented Mar. 20, 1917.
2 SHEETS—SHEET 1.
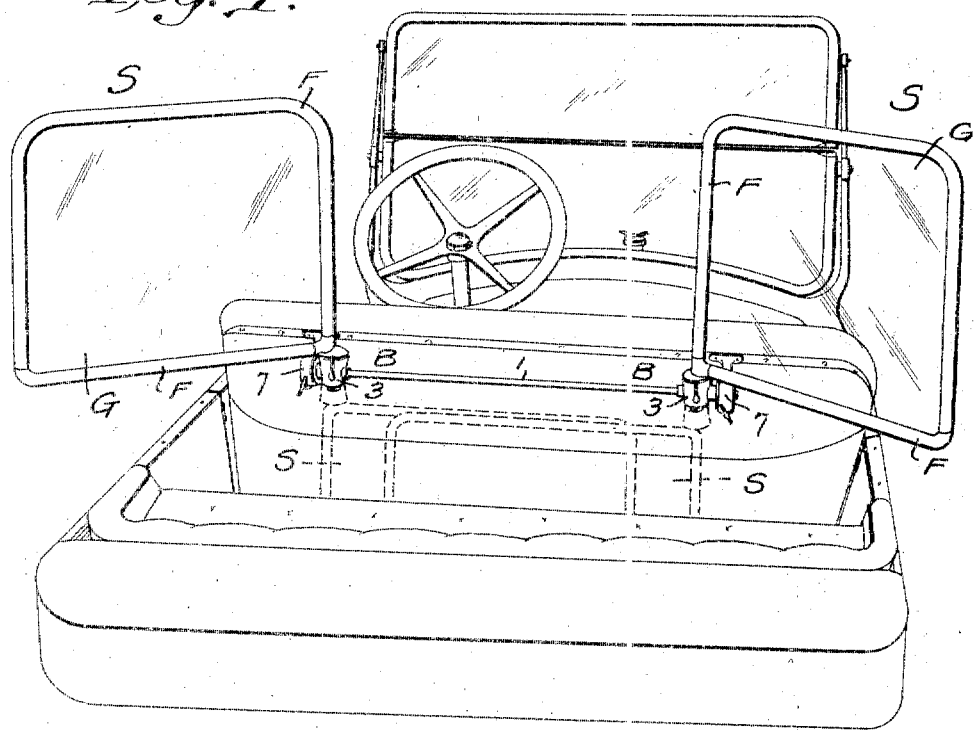
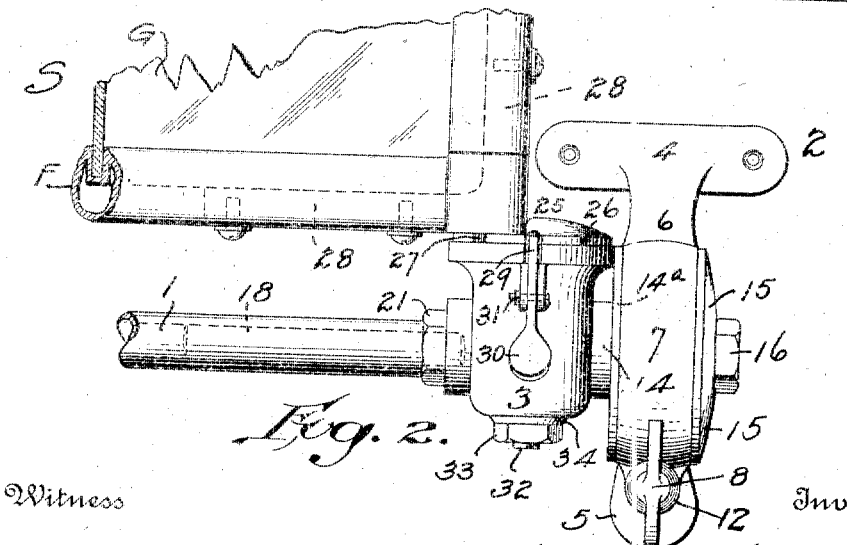

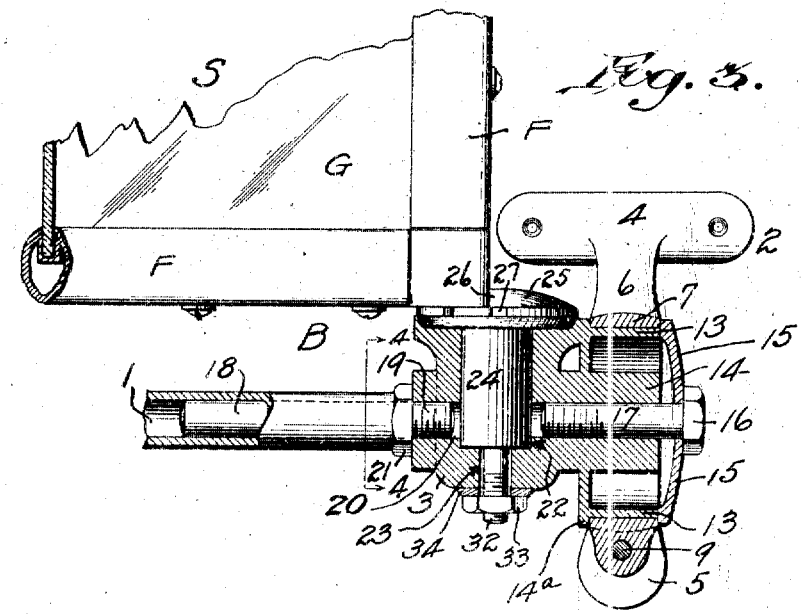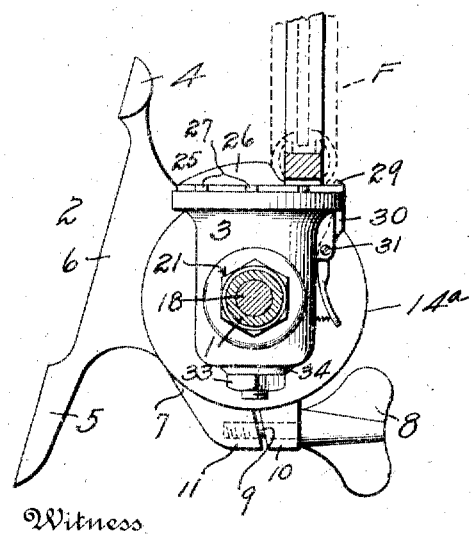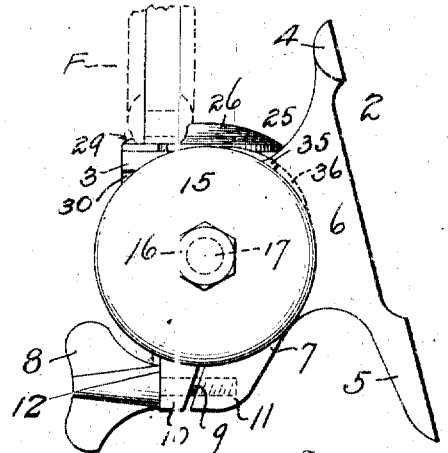

UNITED STATES PATENT OFFICE.

CHARLES F. WENSINGER, OF FREMONT, OHIO, ASSIGNOR TO THE SAFE STORM SHIELD COMPANY, OF FREMONT, OHIO, A CORPORATION OF OHIO.

WIND-SHIELD.

1,219,513.   Specification of Letters Patent.   Patented Mar. 20, 1917.

Application filed November 6, 1915. Serial No. 60,033.

*To all whom it may concern:*

Be it known that I, CHARLES F. WENSINGER, a citizen of the United States, residing at Fremont, in the county of Sandusky and State of Ohio, have invented certain new and useful Improvements in Wind-Shields, of which the following is a specification.

This invention relates to wind shields or guards for vehicles, and more particularly to devices of this character especially adapted for use on motor vehicles to shield and protect the occupants of the rear seat thereof.

At present, the common practice is to locate the accepted and standard type of glass shield on a motor vehicle between the front seat and the engine hood, to thus protect and shield the front seat thereof. However, as is well known a shield in this location is of little or no protection to the occupants of the rear seat, since when the car is in motion the air sweeps around the sides of the shield, and thus proves very annoying and uncomfortable to persons seated in the tonneau. Although various means have been devised whereby the rear seat of a vehicle can be shielded, the same have not come into more general use on account of their impracticability for one reason or another.

Accordingly, the present invention has primarily in view a novel and practical wind shield device that may be conveniently supported at the rear of the front seat of a vehicle to thus protect the occupants of the rear seat, while at the same time being more or less ornamental and not in any way interfering with the accessibility of the tonneau.

Another object of the invention is to provide a wind shield at this location including independently adjustable shield members having simple and reliable means whereby they may be readily brought into service, and readily folded out of the way when not in use.

With the above and other objects in view which will more readily appear as the nature of the invention is better understood, the same consists in the novel construction, combination, and arrangement of parts hereinafter more fully described, illustrated, and claimed.

A preferable and practical embodiment of the invention is shown in the accompanying drawings, in which—

Figure 1 is a perspective view of an automobile, showing the tonneau and the location of the present wind shield device.

Fig. 2 is an enlarged detail elevation of a portion of the supporting bracket for the screen members.

Fig. 3 is a view similar to Fig. 2, but partly in section to more clearly bring out the structural features and characteristics of a novel adjustable supporting means for the screen members.

Fig. 4 is a vertical sectional view on the line 4—4 of Fig. 3, showing the attaching member of the supporting bracket in elevation, and also the detent for maintaining the screen member in the desired adjusted position.

Fig. 5 is a side elevation of the attaching member of the supporting bracket showing the side thereof which is opposite to that appearing in Fig. 4.

Similar reference characters designate corresponding parts throughout the several figures of the drawings.

In carrying out the present invention, it is proposed to provide a wind shield device including independently adjustable screen members which may not only be conveniently handled, but readily set in any desired position to thereby secure the most effective results. In this connection, the invention contemplates a device including the novel screen or shield members referred to, having a relatively fixed position at the back of the front seat. That is to say, that although the screen or wind guard members are capable of moving, the device as a whole remains always in the same position with relation to the upper edge of the front seat. Therefore, as will be observed from Fig. 1, the present invention essentially embodies in its organization the independently adjustable screen members S which include a suitable frame F and a glass G, or other transparent element, carried by a single supporting bracket designated in its entirety as B.

This supporting bracket preferably comprises the horizontal connecting rail 1, which may be conveniently utilized as a robe rail, and the opposite attaching members 2, for pivotally supporting the adjusting blocks 3. The said attaching members 2 may be provided with the attaching ears 4 and 5 for securing the entire supporting bracket to the rear side of the front seat of the automobile, preferably near the top thereof to thereby provide sufficient clearance below the connecting rail 1 for folding the adjustable screen members S down close to the back of the front seat when they are not in use.

Referring more particularly to Fig. 3, it will be apparent that the construction of the attaching members 2 are such that they provide for rotatably mounting the adjusting blocks 3. That is to say, these members are provided with a body portion 6 having formed therewith a frictional clamping band 7 which is preferably in the form of a split ring which may be adjusted by means of the thumb bolt 8, whose shank portion 9 loosely passes through an opening in the lip 10 of the band, and is in threaded engagement with the lip 11. Thus, it will be clear that when the bolt 8 is screwed into the threaded socket of the lip 11, the shoulder 12 thereof will draw the lip 10 toward the lip 11, and thus cause the entire band 7 to frictionally engage the hub portion 13 of the adjusting block 3.

The said hub portion 13 of the block 3 is, for the sake of lightness, of open formation though integral with the block, as will be observed from Fig. 3, and surrounds the horizontal axle portion 14 which is also preferably integral with the body of the adjusting block. One side of the hub portion 13 is provided with an annular flange 14ª which slidably engages the side edge of the band 7, while the open side of the hub portion has fitted thereto a spring cap member 15 which is coextensive with the open side of the hub, and also covers the opposite edge of the band 7. This cap member 15 is held in place by means of a suitable bolt 16, the shank 17 of which is in threaded engagement with the axle portion 14 of the block 3. Therefore, it will be apparent that the said adjusting block 3 is adjustably supported to rotate on a horizontal axis, by being arranged in the clamping band 7 of the attaching member 2. However, in order to insure the rotation of the block 3 on a horizontal axis, and at the same time relieve the attaching member 2 of any undue twisting strain due to the weight of the screen member S, the side of the block opposite the axle portion 14 has detachably fitted thereto a supporting pin 18, the greater portion of which fits within the hollow connecting rail 1, while the portion thereof opposite that within the connecting rail is threaded as at 19 to fit into an opening 20 which is concentric with the axis of the hub member 13. To provide a more finished appearance for this part of the block, and at the same time obtain the desired fit between the rail 1 and the block, a nut 21 may be utilized.

Accordingly, from the foregoing, it will be obvious that the adjusting blocks 3 at each end of the supporting bracket B can freely turn on an axis that lies in a horizontal plane, and owing to the loose fit of the supporting pin 18 of each block in the robe rail 1, it will be clear that these opposite blocks may be independently moved. However it will be apparent that the connecting rail 1 is essential to the adjustment of both blocks, inasmuch as it maintains the hub portions 13 thereof in proper relation to the clamping bands 7 of the attaching members to prevent them from binding therein, as might be the case if the blocks were canted under the weight of the screen members S.

Referring further to the structural features of the block 3, it will be observed that the same is provided with a central socket 22, having at the bottom thereof an opening 23, the purpose of which will hereinafter more fully appear. This socket 22 receives the shank portion 24 of a swinging screen carrier member designated in its entirety as 25. Thus, the shank 24 of the carrier member constitutes a vertically arranged axis for permitting the free swinging movement of the screen S, or in other words, it provides for the swinging of the screen laterally so that it may be adjusted to any desired position to protect the occupants of the rear seat.

One end of the vertical shank 24 of the carrier 25 is provided with an enlarged head 26 having a plurality of peripheral notches 27, and carrying therewith an angle member 28, shown in dotted lines in Fig. 2 for supporting the frame F of the screen. The notches 27 at the peripheral edge of the head 26 are adapted to receive the locking end 29 of a spring-pressed detent member 30 which may be conveniently pivoted as at 31 on the side of the adjusting block 3. This detent member may be rocked on pivot 31 by a thumb pressure on the handle end thereof to disengage the locking end 29 from any one of the notches 27 to thus permit the lateral swinging of the screen S, and on the other hand when the screen is in the desired adjusted position, the detent will maintain it there, as the locking end 29 will reënter another notch 27 upon the release of the thumb pressure.

The end of the vertical pivot shank 24, opposite the head 26, carries a bolt extension 32 which passes through the opening 23 at the bottom of the socket 22 to an exposed position at the bottom of the block, where it may receive a clamping nut 33 which bears against a suitable washer member 34 interposed between itself and the bottom of the block. The nut 33 is fitted to the bolt extension 32 in such a manner that the free swinging movement of the vertical pivot shank 94 is in no way hindered, but at the same time any tendency of the pivot shank to leave the socket 22 is prevented. In other words, the nut 33 loosely locks the swinging screen carrier to the block 3 so that when it is desired to shift the screen member to an out of the way position, it will not fall from the block 3.

From the foregoing description, it will be clearly apparent that each screen member S has a free movement on a horizontal axis, and also a free swinging movement on a vertical axis, so that practically any desired adjustment of the screens may be affected.

In connection with the horizontal adjustment, it will be observed more particularly from Fig. 5 that the block 3 carries at the upper side thereof, preferably on the annular flange 14ª, a stop member 35 which abuts with a reversely arranged stop member 36 carried by the body 6 of the attaching member 2, as shown in dotted lines in the figure referred to. This construction prevents the turning of the block 3 on a horizontal axis in a backward direction, and aids in maintaining the block 3 in an upright position when the screens are in use.

It is thought that the manipulation and operation of the present wind shield device will be entirely clear from the foregoing, and further reference to the manner of operation is therefore believed to be unnecessary except to observe that the novel construction described in detail provides positive and efficient means for obtaining any desired positioning and adjustment of the screens S to protect the occupants of the rear seat. It will also be obvious that the screens may be easily shifted to an out of the way position even when in their service position, as shown in Fig. 1, to permit ready ingress and egress from the tonneau. When it is desired to entirely do without the use of the shields, it is thought that it will be clear that they may be shifted to the dotted line position shown in Fig. 1, and thus be entirely out of the way, through the novel adjusting means described.

From the foregoing, it is believed that all of the features and advantages of the present invention will be readily understood, and that changes in the form, proportion, and minor details of construction may be resorted to without departing from the scope of the appended claims.

I claim:

1. A wind shield device for protecting the occupants of the rear seat of a vehicle, comprising a supporting bracket including oppositely located attachment members, a screen adjusting block carried by each member, a connecting rail having its ends loosely fitting in each of said blocks, and a screen member carried by each adjusting block, and having means whereby each screen may swing on both a horizontal and vertical axis independent of the other.

2. A wind shield device for protecting the occupants of the rear seat of a vehicle, comprising a supporting bracket including opposite attaching members and an intermediate connecting rail, and an adjusting block pivotally supported between each end of the connecting rail and each attaching member, and a protecting screen carried by said adjusting block.

3. A wind shield device for protecting the occupants of the rear seat of a vehicle, comprising a supporting bracket including oppositely located attaching members and an intermediate connecting rail, and adjusting blocks pivotally supported between the connecting rail and attaching members to move on a horizontal axis, and a screen member carried by each of said adjusting blocks and movable independently of the other.

4. A wind shield device for protecting the occupants of the rear seat of a vehicle, comprising a supporting bracket including oppositely located attaching members and an intermediate connecting rail, and a screen member located at each end of the supporting bracket, and having means for adjustably supporting the same to swing on both a vertical and a horizontal axis, said means comprising an adjusting block having horizontal supporting means respectively bearing in said attaching members and connecting rail, a swinging screen carrier, and means for locking said screen carrier in any adjusted position.

5. A wind shield device for protecting the occupants of the rear seat of a vehicle, comprising a supporting bracket including oppositely located attaching members and an intermediate connecting rail, and a screen member located at each end of the supporting bracket and having means for adjustably supporting the same to swing on both a vertical and a horizontal axis, said means comprising an adjusting block having a hub at one side for working in said attaching member, and a supporting pin at the other side engaging with said connecting rail, a swinging screen carrier mounted on said adjusting block, and means carried by the block for locking said carrier in any adjusted position.

6. A wind shield device for protecting the occupants of the rear seat of a vehicle, comprising a supporting bracket including oppositely located attaching members and an intermediate connecting rail, and a screen member located at each end of the supporting bracket and having means for adjustably supporting the same to swing on both a vertical and a horizontal axis, said means comprising an adjusting block having a hub for working in said attaching member and a supporting pin engaging with said connecting rail, and also having a socket, a swinging screen carrier having a pivot shank fitting in said socket, means for holding said screen carrier in the socket, and means carried by said block for locking said swinging carrier in any adjusted position.

7. A wind shield device for protecting the occupants of the rear seat of a vehicle, comprising a supporting bracket including oppositely located attaching members having clamping means and a hollow connecting rail, and a screen member located at each end of the supporting bracket, means for adjustably supporting said screen member comprising an adjusting block having a hub portion for frictionally engaging with the clamping means of the attaching member, a supporting pin carried by the block and loosely fitting in said hollow connecting rail, said block also having a socket, a swinging screen carrier having a pivot shank constituting a vertical axis fitted in said socket, means for holding said screen carrier in the socket, said screen carrier having a plurality of peripheral-locking notches, and means carried by said block for engaging with said locking notches of the carrier member for holding the same in adjusted position.

In testimony whereof I hereunto affix my signature in the presence of two witnesses.

CHARLES F. WENSINGER.

Witnesses:
A. K. HODES,
CHESTER A. CULBERT.